April 6, 1971     L. J. LUBER ET AL     3,574,043
REFLECTIVE MATERIAL AND METHOD OF MAKING SAME
Filed Dec. 11, 1967
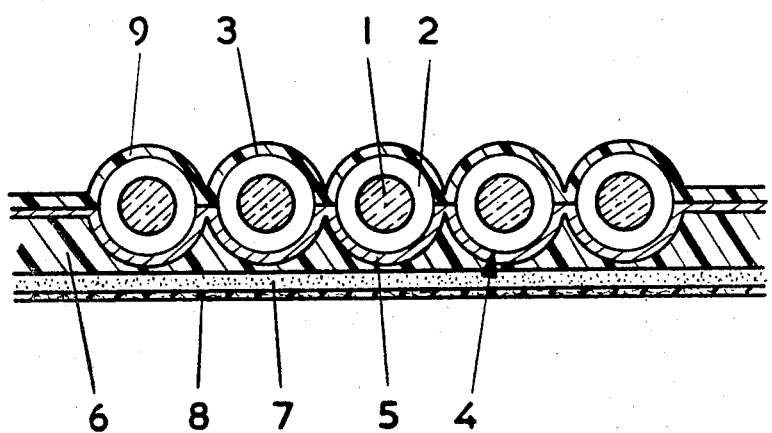
INVENTORS
LEONARD J. LUBER
ALFRED T. CLUTTON
By Emory L. Groff
Atty United States Patent Office 3,574,043
Patented Apr. 6, 1971

3,574,043
REFLECTIVE MATERIAL AND METHOD OF MAKING SAME
Leonard Joshua Luber, Woollahra, New South Wales, and Alfred Thomas Clutton, Harbord, New South Wales, Australia, assignors to Industrial Science Research Pty. Limited, Sydney, New South Wales, Australia
Filed Dec. 11, 1967, Ser. No. 689,439
Claims priority, application Australia, Dec. 13, 1966, 15,188/66
Int. Cl. B29d 27/04; B32d 27/04
U.S. Cl. 161—5    17 Claims

ABSTRACT OF THE DISCLOSURE

A reflective material and a method of making such material wherein a series of spaced reflective glass beads are encapsulated in a coating or surface material in solid or liquid form which is protectively enveloped by a carrying compound. The beads, the coating material and carrying compound are heated to a temperature sufficient to gasify the coating material which provides a series of coating gas bubbles retained within the carrying compound and each bubble encapsulates an individual bead which in effect is running freely in a gas bubble. The aforementioned components are then incorporated into a base carrier such as paint or ink or laminated to a base carrier in sheet form.

---

This invention has been devised to provide improved reflective material such as tapes, sheets, films, or paints, inks, lacquers and the like; to methods of forming such material; and to encapsulated beads incorporated therein. The term "reflective" is used herein to define a material which will reflect hemispherically substantially up to 180° in all directions.

In the manufacture of reflective material, the concept of incorporating glass beads into a carrier therefor, whereby such glass beads act as a reflective medium, is known. Various techniques have been developed in an attempt to fixedly support such beads in a laminated sheet of material so that the beads are kept substantially separate—and the degree of reflectability of the beads not unduly impaired. However, up to the time of the present invention, no completely satisfactory technique has been developed for ensuring continuous and optimum reflectability from each bead as it has not been found possible to satisfactorily support the individual beads.

The present invention provides an improved material, and a method of making such material, whereby the above required optimum reflectibility of the beads is successfully achieved. By the method of the invention, the material may be produced economically and by simple production techniques. The invention also provides an improved structure of beads per se, and a method of making such beads.

According to the invention, there is provided a reflective material comprising a series of spaced reflective beads, each said bead being encapsulated in a coating material; a carrying compound protectively enveloping said coating material; and a base carrier in which the aforementioned components are incorporated, or, to which the aforementioned components are laminated, said coating material being constituted by a series of gas bubbles with each reflective bead individually and freely held within its associated encapsulating bubble.

The invention also provides a method of making the reflective material comprising the steps of initially coating a batch of reflective beads with a surface material in solid or liquid form, separating said coated beads into a spaced individual series thereof, incorporating the thus spaced beads into a carrying compound; heating the above ingredients to a temperature sufficient to gasify the surface material, whereby a series of coating gas bubbles, retained within the carrying compound and each freely encapsulating an individual bead, is obtained, and finally either incorporating the aforementioned components into a base carrier or laminating such components to a base carrier.

Finally, the invention also provides a bead which is freely encapsulated within a gaseous coating material, the said coating material being in turn protectively enveloped within a carrying compound.

The beads can be of any transparent material; however, glass beads are preferred. In like fashion, while the material used to coat the individual beads may be formed from any gasifiable material (i.e. any material which will change from a solid or liquid to a gaseous state with or without decomposition thereof), a particularly suitable such material is ammonium carbonate. Proceeding further, the carrying compound can be any suitable polymerised or polymerisable thermoplastic or thermosetting compound; in particular, if a thermoplastic polymer is required, polymethylmethacrylate has been found to be especially suitable. Finally, as will be understood from the opening paragraph, the base carrier is such that the finally produced reflective material can be either a laminated-type sheet material product or a paint, lacquer or the like.

The invention will now be described with reference to several examples, the first example—whereby a sheet of reflective material is produced—being additionally exemplified in the attached schematic exploded representation thereof. It is to be understood that such examples are only representative of the numerous environments and applications wherein the invention can be employed.

EXAMPLE 1

To form a reflective sheet of material, the following ingredients are employed.

(1) Glass beads, having a refractive index of 1.95 and a diameter range of 20–50 microns.
(2) Polymethylmethacrylate.
(3) Chloroform.
(4) White pigment particles of titanium dioxide of 3.45 micron dimensions.
(5) Aluminium powder of about 200 mesh.
(6) Silicone-coated releasing paper.
(7) Ammonium carbonate.
(8) A wetting agent.
(9) Acetone.

The example also requires the use of such standard laboratory or industrial equipment as mixing vessels (with provision for requisite stirring), a thermostatically controlled oven having air reticulation to evenly disperse heat therein, suitable freeze-drying (refrigerating) equipment; fluidised bed apparatus; a solvent recovering system and a set of pressure adjustable rollers—desirably coated with the material known in the art as Teflon.

In carrying out the process a batch of the glass beads is initially degreased by washing in acetone. Ammonium carbonate freshly and finely powdered is placed in a suitable container and dissolved in distilled water (one part by weight ammonium carbonate to 10 parts by weight water) and the resulting solution has incorporated therein a small quantity (e.g. 0.05% parts by weight) of the wetting agent. A suitable wetting agent is that which is known in the art by the trade name "Lissapol."

The glass beads, cleaned as aforesaid, are now added to the ammonium carbonate solution, mixed thoroughly therein and the ammonium carbonate-covered beads are then transferred to the refrigerating equipment for freeze-drying. During the drying operation, the container is continuously oscillated—or otherwise agitated—so as to ensure that the beads do not agglomerate together, the product, on completion of the drying operation, being in the physical form of a series of microscopic powder-encapsulated marbles. To assist in the attainment of this product, the ammonium carbonate solution may have incorporated therein a small quantity of a binding agent (e.g. methyl cellulose) and an anti-crystallisation agent such as gelatin, or colloidal silver iodide. In addition, if even firmer adhesion of the ammonium carbonate to the beads is required, an adhesion promoting sulphur containing gel (such as the type known commercially as Thiogel) can be employed. The thus dried and coated beads, if not immediately required, are stored in a hermetically sealed container.

At this stage of the operation, the polymethylmethacrylate is dissolved in the chloroform, and a portion of the resulting solution has envelopably incorporated therein a layer of the ammonium carbonate-coated beads. This composite is then poured into a shallow levelled tray which is provided with a lining film of the silicon releasing paper and the surface of which is either smooth or, as in this case, dimpled.

The tray and contents are transferred to the oven and the temperature of the oven is set at 160° F. As the temperature of the contents rises, the chloroform will first evaporate, and as the polymethylmethacrylate solidifies, the ammonium carbonate will disintegrate into its constituent gases, the effect being the production of bubbles of gas with a glass bead encased and running free in each bubble. Care must be taken that the temperature does not exceed 160° F. so that the polymethylmethacrylate does not decrease in viscosity to such an extent that the gas bubbles could be permitted to escape. Upon removal of the product from the oven (after the gasification of the ammonium carbonate is complete) and cooling thereof, the product is a sheet which is a combination of enveloping carrying compound (polymethylmethacrylate); an encapsulating material (the gas bubbles) and a series of spaced reflective glass beads individually and freely encased in said encapsulating material. The form of this sheet is such that the surface adjacent the dimpled silicon releasing film has a configuration which follows that of the film (in this instance domed) the adjacent part of each bubble being of complementary configuration. Also, the surface remote from such film is—as a result of the formation of the gas bubbles and the resulting stretching of the polymethylmethacrylate therearound—constituted by a series of spaced small domes. The advantages of this structure are that by virtue of the domed formation, the reflective surface area of the beads is increased, very low angle reflection is achieved, and the reflective effect of any coating used in conjunction with such domes is also augmented.

To finally produce the sheet of reflective material (the base carrier in this case being additional sheets or layers to which the above produced sheet is laminated) the sheet is removed from the tray and the following additional steps are carried out.

The aluminum powder and titanium dioxide (1 part $TiO_2$ to 100 parts Al) are stirred to a further portion of the polymethylmethacrylate-chlorofrom solution and a layer of the resultant mixture is conventionally applied, as by spraying or brushing, to one domed surface of the sheet. After drying of this layer preferably at ambient temperature, a further layer of polymethylmethacrylate (alone) in sheet form is applied thereto so as to provide a surface which is essentially level; if a single layer of polymethylmethacrylate is insufficient to achieve this purpose, one or more additional layers is (are) superposed until an even surface is produced.

The concluding sequential steps in the process are the passage (if desired) of the layer sheet of material through the adjustable coated rollers, the spraying of a pressure sensitive coating onto the level of the sheet, the application of a release film to the pressure sensitive coating, and the final trimming of the sheet to size.

In the accompanying drawings, an exploded schematic representation of a sheet of reflective material in accordance with the aforementioned example is depicted. Thus, it will be seen that glass beads 1 are individually and freely encapsulated within bubbles of gas 2, each such bubble in turn being envelopably protected by the polymethylmethacrylate carrying compound 3. The selected domed surface 4 of such compound has the aluminum-titanium dioxide layer 5 applied thereto, an additional layer 6 of polymethylmethacrylate thereover, a layer 7 of pressure-sensitive adhesive superposed thereon, and a final release film 8. The domed surface of the polymethylmethacrylate which was adjacent to the silicon releasing film, and is now the exposed surface, is designated by the numeral 9. It is a reinforcing layer which does not alter the effect of the domed surface. It will be appreciated that for the purposes of illustration—and so as to distinguish the various layers (and the like) involved—the drawing is highly exaggerated in scale.

By carrying out the above procedure, a sheet of reflective material having optimum reflectability, as above defined, can be obtained. Such sheet can, of course, be made in any dimensions depending upon the purpose for which it is required. By way of example, sheets of 0.003" thick and 2' square find common application in traffic and other display environments.

EXAMPLE 2

In preparing a reflective paint, a procedure in accordance with the early steps of Example 1 (i.e. down to but excluding the final laminate-forming steps) is followed with these exceptions.

(i) Instead of a polymethylmethacrylate-chloroform solution, the ammonium carbonate-coated glass beads are enveloped individually, by fluidised bed apparatus, in a carrying compound which is the polychlorsulphonated polyethylene known commercially as Hypalon.

(ii) While the above ingredients are again heated to 160° F. to decompose (gasify) the ammonium carbonate, a silicone-coated releasing tray is not necessary, the heating being carried out in the fluidised bed apparatus.

(iii) The encapsulated free running glass beads are mixed directly into a paint (which in this case constitutes the base carrier). The only proviso which much be observed is that the paint does not contain any ingredient which would decompose the polychlorsulphonated polyethylene.

EXAMPLE 3

In preparing a sheet of reflective material, glass beads are preliminarily cleaned and coated with ammonium carbonate as in Example 1. Thereafter, the procedure is as follows.

(i) The ammonium carbonate-coated glass beads are enveloped individually by fluidised-bed apparatus, in polychlorosulphonated polyethylene known commercially as Hypalon.

(ii) Heating to 160° F. is carried out in the fluidised bed apparatus, thereby providing a homogeneous series of beads, each freely encapsulated in an individual bubble of gas and protectively enveloped in the polychlorsulphonated polyethylene.

(iii) A thus coated layer of beads is applied by pressure to a thickened layer of reflective backgroud material, the wall of each bubble containing a bead being retainably embedded therein and partially projecting therefrom so as to provide a domed surface. The reflective background material is the aluminum powder-titanium dioxide composite described in Example 1.

(iv) The reflective background material has sequentially applied thereto a layer of pressure sensitive adhesive and a final release film.

The resultant product is a sheet of reflective material which, in appearance, is substantially as illustrated in the accompanying drawing (an exception, of course, being that polychlorsulphonated polyethylene is used in lieu of polymethylmethacrylate).

EXAMPLE 4

In this example, ingredients 2 and 3 of Example 1 are replaced by a solvent-free (i.e. non-chloroform containing) polymethylmethacrylate. The procedure is otherwise the same and a similar type of product is formed.

EXAMPLE 5

Glass beads, preliminarily cleaned as in Example 1, are coated with a silicone jelly, and the thus coated beads are subjected to treatment with a finely powdered nitrogen containing compound, viz powdered (i.e. solid) thiotriazole. The above treatment is carried out in a rumbler with continuous agitation to ensure that the beads are homogeneously covered and completely encapsulated— and that they are retained separate from one another. This separation can be augmented by the addition of an antiagglomeration agent such as the silica-based compound known commercially as "Carb-O-sil."

Thereafter, a fluidised bed of the encapsulated beads is coated with a polyester resin thermosetting carrying compound and the components are heated in the bed so as to decompose the thiotriazole (a temperature of 300° F. is satisfactory) and cure the resin whereby glass beads individually and freely encapsulated in nitrogen bubbles, are produced. The final steps, to produce a laminated sheet of material, are performed similarly to Example 3. However, the product, in this case, will be a tougher abrasion-resistant material.

EXAMPLE 6

The procedure of Example 1 is followed with these exceptions.

(i) As in Example 4, a chloroform-free polymethylmethacrylate is employed as carrying compound.

(ii) Instead of stirring the coated (with ammonium carbonate) beads into the carrying compound, a thin layer of such compound is spread on a suitable base and a layer of the coated beads is added thereto. The beads are then treated with a further layer of the compound so as to fully envelop same.

The following steps (viz heating to decompose the ammonium carbonate etc.) are as in Example 1.

EXAMPLE 7

The procedure of Example 1 is followed except that a thermosetting resin (such as a polyester resin) is employed and multi-edged fragments of polyvinyl chloride coloured with fluorescent pigments are incorporated with the glass beads. The product, in addition to having the desirable properties of Example 1, will be substantially abrasion resisting (e.g. of the type which can be used in pedestrian crossings, roadway markings, and the like) and will also, depending upon the pigments used, be variably effective in its colouring.

EXAMPLE 8

The procedure of Example 1 is varied as follows:

(i) Instead of adding the glass beads to a solution of ammonium carbonate, the beads are preliminarily coated with a silicone jelly (as in Example 5).

(ii) Following this coating, the beads are sprayed with finely powdered (solid) ammonium carbonate. This treatment may (again see Example 5) be carried out in rumbler with continuous agitation.

The subsequent detailed treatment (viz incorporation into polymethylmethacrylate, lamination, etc.) is as described in Example 1.

EXAMPLE 9

The procedure of Example 2 is followed. However, in this case the base carrier, instead of being a paint, is an ink.

EXAMPLE 10

In the above examples, reflective material (as a sheet, a paint or the like) has been produced. However, if a supply of beads is merely required (e.g. for storage purposes) Example 3 can be followed and terminated at step (ii).

It is again to be understood that the above examples are only illustrative of the divers types of material which can be produced in accordance with the invention.

For instance:

(a) Instead of thiotriazole, other nitrogen-gas releasing compounds could be employed. Examples of such compounds are azodicarbonamide and diphenyl-sulphon-3,3-disulphonylhydrazide.

(b) The above mentioned thermosetting and thermoplastic polymers could be replaced by any monomer or polymer adequate for the particular purpose in mind. Thus, if a thermosetting compound is required, the polyester resin of Examples 5 and 7 could be replaced by an epoxy resin. Likewise, if a material is required which is both thermoplastic and substantially resistant to distortion, abrasion and softening, polyvinyl chloride may be employed. Finally, if the monomeric form is preferred, any acrylic monomer would be suitable.

(c) In lieu of the silicone jelly coating (e.g. Example 5) a liquid silane or the adhesive type compound known commercially as Dow Corning DC 280 may be employed. In the latter case, such adhesive is usually augmented by the addition of a small percentage (e.g. 3%) of benzoyl peroxide.

(d) Apart from the titanium dioxide of Example 1, optical brighteners such as barium titanate may be incorporated to add lustre to the product.

Similarly—and especially if the end product is to be subjected to abrasion— it may be advisable to augment the product by the addition thereto of tough transparent fibres.

It will of course be understood that if any of the above mentioned alternative ingredients (e.g. the different nitrogen releasing compounds specified in (a)) are used in lieu of those mentioned in the specific examples, the condition of operation (e.g. the temperature to which the encapsulating material has to be heated to achieve volatilisation) are varied as required.

In conclusion, it is also pointed out that while the invention has been exemplified with particular reference to glass beads, it should not be regarded as confined thereto. While glass is eminently suitable for the purpose of the invention, any reflective plastics material (e.g. the reflective "perspexes") could be substituted therefor. Finally, it will be realised that while separate and individual encapsulation of the beads is invariably achieved, a circumstance in which say, two beads become joined and encapsulated within a gas bubble (to become in fact a single bead running freely therein), is to be regarded as within the spirit and scope of the invention.

We claim:

1. A reflective material comprising a series of spaced reflective beads, each said bead being encapsulated in a coating material; a carrying compound protectively enveloping said coating material; and a base carrier within which the aforementioned components are embedded, the said coating material being constituted by a series of gas bubbles with each reflective bead individually and freely held within its associated encapsulating bubble.

2. A reflective material as claimed in claim 1 in which the said beads are constituted by glass beads.

3. A reflective material as claimed in claim 1 in which the coating material is formed by gasification of ammonium carbonate.

4. A reflective material as claimed in claim 1 in which the coating material is formed by gasification of thiotriazole, azodicarbonamide or diphenyl-sulphon-3,3-disulphonhydrazide.

5. A reflective material as claimed in claim 1 in which the carrying compound is polymethylmethacrylate.

6. A reflective material as claimed in claim 1 in which the base carrier comprises, in sequential laminar form, a sheet of material containing reflective metallic particles, one or more sheets of thermoplastic protective material, a layer of pressure-sensitive adhesive coating, and an outer release film.

7. A reflective material as claimed in claim 1 wherein the base carrier is a hardened paint or ink.

8. A reflective material as claimed in claim 1 in which the carrying compound is polychlorsulphonated polyethylene.

9. A reflective bead which is freely encapsulated within a gaseous coating material, the said coating material being in turn protectively enveloped within a carrying compound.

10. A bead as claimed in claim 9 in which such bead is a glass bead, the encapsulating coating material is decomposed ammonium carbonate, and the carrying compound is polymethylmethacrylate or polychlorsulphonated polyethylene.

11. A method of making reflective material comprising the steps of initially coating a batch of reflective beads with a surface material, separating said coated beads into a spaced individual series thereof, incorporating the thus spaced beads into a carrying compound; heating the above ingredients to a temperature sufficient to gasify the surface material whereby a series of coating gas bubbles, retained within the carrying compound and each freely encapsulating an individual bead, is obtained, and incorporating the aforementioned components within a base carrier.

12. A method of making a reflective material comprising the steps of initially coating a batch of reflective glass beads with a liquid surface material, freeze-drying such coated beads with continuous agitation so as to separate such beads into a spaced individual series thereof, incorporating the thus spaced beads into a carrying compound, heating the above ingredients to a temperature sufficient to gasify the surface material whereby a series of coating gas bubbles, retained within the carrying compound and each freely encapsulating an individual glass bead, is obtained, and incorporating the aforementioned components within a base carrier.

13. A method as claimed in claim 12 in which the surface material is ammonium carbonate and the carrying compound is polymethylmethacrylate.

14. A method as claimed in claim 12 in which the final step of incorporating the aforementioned components within a base carrier comprises successively and sequentially adding to one surface of the carrying compound a series of additional layers comprising a layer of aluminum powder and titanium dioxide, one or more layers of polymethylmethacrylate, a pressure-sensitive adhesive layer, and finally an outer release film to thus provide a reflective material in laminar form.

15. A method as claimed in claim 12 in which the surface material is ammonium carbonate, the carrying compound is polychlorsulphonated polyethylene and the final step of incorporating into a base carrier comprises addition of the components to a hardenable paint or ink.

16. A method as claimed in claim 12 in which the incorporation of the spaced beads into the carrying compound is effected by fluidisation.

17. A method of making a reflective bead comprising initially coating a said bead with a surface material, incorporating the bead into an enveloping carrying compound, and heating the above ingredients so as to gasify the surface material whereby a coating gas bubble, retained within the carrying compound and freely encapsulating the bead, is obtained.

References Cited

UNITED STATES PATENTS

| | | | |
|---|---|---|---|
| 3,492,192 | 1/1970 | Bullard | 156—78X |
| 2,407,680 | 9/1946 | Palmquist et al. | 350—105 |
| 3,110,614 | 11/1963 | De Vries | 117—100 |
| 3,247,153 | 4/1966 | De Vries | 117—100 |
| 3,288,618 | 11/1966 | De Vries | 161—5 |
| 3,253,146 | 5/1966 | De Vries | 250—71 |
| 3,382,302 | 5/1968 | Marzocchi | 264—45 |
| 3,396,923 | 8/1968 | Windecker | 244—123 |
| 3,400,035 | 9/1968 | Haig | 161—170 |
| 3,405,025 | 10/1968 | Goldman | 161—162X |
| 3,429,955 | 2/1969 | Johnson et al. | 264—45 |

HAROLD ANSHER, Primary Examiner

U.S. Cl. X.R.

117—16, 100; 156—78, 80; 161—6, 160, 162, 168, 203, 204, 409